United States Patent [19]

Horvath

[11] Patent Number: 4,775,076
[45] Date of Patent: Oct. 4, 1988

[54] SEALED PACKAGE, METHOD FOR MANUFACTURING AND UTILIZATION OF SAID PACKAGE

[75] Inventor: Laszlo Horvath, Geneva, Switzerland

[73] Assignee: Cod Inter Techniques S.A., Geneva, Switzerland

[21] Appl. No.: 878,984

[22] PCT Filed: Oct. 7, 1985

[86] PCT No.: PCT/CH85/00147
§ 371 Date: Jun. 3, 1986
§ 102(e) Date: Jun. 3, 1986

[87] PCT Pub. No.: WO86/02055
PCT Pub. Date: Apr. 10, 1986

[30] Foreign Application Priority Data

Oct. 5, 1984 [FR] France ................................. 84 15439
Mar. 18, 1985 [FR] France ................................. 85 04078

[51] Int. Cl.4 ............................................. B65D 41/00
[52] U.S. Cl. ..................................... 220/359; 220/23; 215/232
[58] Field of Search ................. 220/359, 23; 215/232, 215/254

[56] References Cited

U.S. PATENT DOCUMENTS

| 2,629,534 | 2/1953 | Reynolds | 220/359 X |
| 3,070,275 | 12/1962 | Bostrom | 220/23 X |
| 3,244,306 | 4/1966 | Stolk | 215/232 X |
| 3,437,257 | 4/1969 | Bua | 220/359 X |
| 3,447,711 | 6/1969 | Bozek | 220/359 X |
| 3,997,056 | 12/1976 | Mueller | 220/359 X |
| 4,009,793 | 3/1977 | Minesinger et al. | 220/359 X |

Primary Examiner—Steven M. Pollard
Attorney, Agent, or Firm—Frost & Jacobs

[57] ABSTRACT

A sealed package and method for producing said package which is substantially comprised of a container and a cover adjusted to the container. The container comprises a flange provided with a lip oriented downwardly of the container. The cover comprises a flange provided with a lip. Both lips have each an outer cylindrical surface which is oriented in the prolongation of each other. A flexible seal tape is welded or glued against both cylindrical surfaces to hold the cover and the container together. This package is particularly appropriate to hold food products such as beverages, prepared or precooked meals or sterile or aseptized substances.

5 Claims, 7 Drawing Sheets

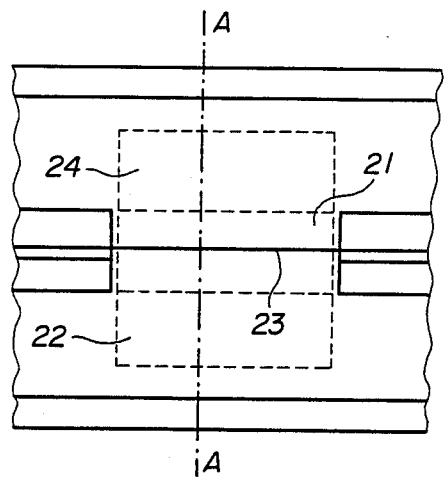
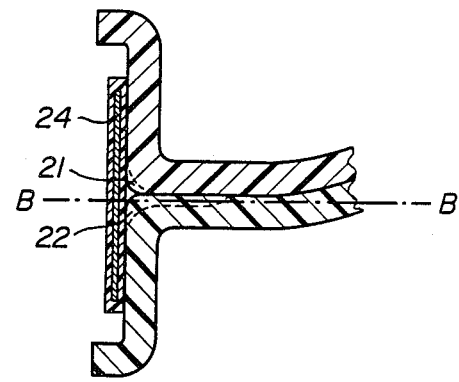
FIG. 3  FIG. 4
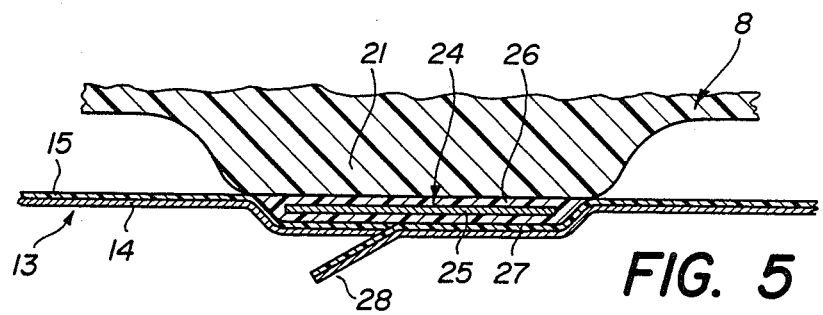
FIG. 5
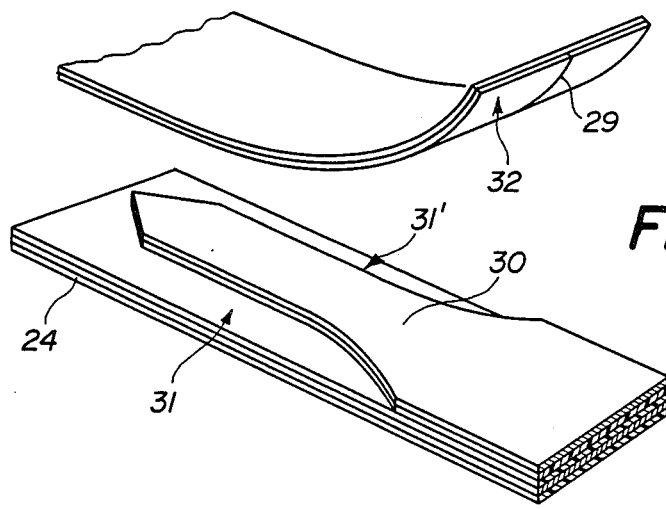
FIG. 6

SEALED PACKAGE, METHOD FOR MANUFACTURING AND UTILIZATION OF SAID PACKAGE

The invention relates to a sealed package comprising a container having an opening and a cover which are made of a synthetic moulded, blowed or thermoformed material, the external faces of this container and this cover being made of a thermoplastic material and having cylindrical surfaces flushed to each other, and a flexible detachable strip sealed on said cylindrical surfaces to hold the cover on the container.

The invention also relates to a method for manufacturing of said package as well as to an utilization of the package obtained thereby.

The french patent application published under No. 2'267'946 describes a metallic box with a detachable cover sealed by an adhesive strip which assembles the cover and the container. The sealing thus obtained is very limited and does not satisfy with conditions of a long time preservation of damageable products such as food products, i.e. ready-cooked vegetables, dishes, etc... In the matter of long time preservation the requirements are particularly strict. The use of an adhesive strip to join the cover with container does not permit to meet these requirements.

The french patent published under No. 2'044'060 describes a package of synthetic material with a detachable cover sealed by a flexible adhesive strip closing the slit located between the cover and the container. As mentioned above an ordinary adhesive strip does not permit to reach requirements necessary to guarantee a long time preservation.

Among known sealed package the most recently developed ones comprise a rigid container made of a synthetique multilayer thermoformed material wich represents a diffusion barrier against oxygen and steam and a cover wich is welded to a plane edge of the container. The cover is generally made of a flexible aluminum foil wich also comprises such a barrier, further encompassing a film of a heat sealable material which may be welded to the edge of the container. This type of package is often but not exclusively used to contain food in particular prepared dishes.

One of the drawbacks of such package is due to the fact that the cover may not be re-used after it has been pulled off the container and the package may therefore not be closed again after it had once been opened.

Another drawback of this type of package is the inevitable residue remaining attached to the container after its opening which inhibits the use of the opened container as a plate for direct consumption of the elements which are contained in the package.

A further drawback of this type of package is the low reliability of the annular welding seam along which the cover is fixed to the container. The smallest deficiency of this member, due e.g. to a particle or a fiber of the food crossing said welding zone, constitutes a weak point of said closure risking an eventually dangerous contamination of the products contained in the package.

Moreover the cover is relatively weak and the risks of cracks during storage or manipulation are not negligeable. This disadvantage is particularly important for a container made of a flexible aluminum foil comprising a film of a heat sealable material.

This last drawback has been overcome by the substitution of the cover consisting of heat sealable aluminum by a cover which is made of a gas tight synthetic multilayer heat formable material which is thick and rigid enough to resist shocks and considerable pressures. However these covers need a longer time to be welded to the plane edge of the container and this opening which is more difficult may be achieved only by means of special tools.

Moreover and particularly for flexible foil type covers they can not be used as plates nor may they be reutilized and the welding zone does not always represent the desired reliability to shield the contents of the package againts all kinds of contamination as mentioned before The present invention eliminates all these different drawbacks by providing a sealed package of simple concept conceived for economical manufacture in large series and which may be re-used after its opening for a different purpose.

To obtain this object, the package according to the invention is characterized in that the flexible strip is multilayered with an internal surface made of a thermoplastic material sealable to said synthetic material, at least one intermediate layer made of an impervious material for gas and vapour, and an external layer made of a material which is not sealable to said thermoplastic material, in that this flexible strip is sealed to the container and to the cover along two parallel closed loop-shaped sealing zones extending without interruption on said cylindrical surfaces.

According to a preferred embodiment, the container and the cover are made of juxtaposed divided elements.

According to another avantageous embodiment, said cylindrical surfaces are provided each one at a part of their circumference with an outwardly extending beak-like projections, the edges of which being flushd to each other perpendicularly to the axis of the flexible strip, the two ends of this flexible strip being sealed back to back to the end of said edges.

The cover may be integral with the container through at least one local joining of their faces, said local joining being adapted to connect said cylindrical surfaces along a part of their circumference.

In this case, the cover may be the attached to the container through an annular joining of their faces, the joining zone being limited by a peripheral groove separating said cylindrical surfaces, said peripheral groove being interrupted by said local joining.

In this case also, said local joining may be provided with a square element having two faces coated with a material sealable to said thermoplastic material coating the external faces of the container and of the cover, this square element being sealed on said cylindrical surfaces of the container and the cover.

This square element is advantageously sealed on juxtaposed supports, each comprised within cylindrical surfaces and making an ininterrupted zone joining the cover to the container.

The cover and the container are preferentially made of a same moulded, blowed or thermoformed element provided with a slot or a groove separating said cylindrical surfaces.

According to another embodiment, the cover comprises an opening closed by a closing element made of an impervious material for gas and vapour, sealed to this cover.

According to an alternative embodiment of the invention the container is provided, at its lower part opposite to the cover, with an opening closed by a closing element sealed to this container.

One of the free ends of the strip advantageously comprises two symetrical recesses, the other end being sealed to said local joining surface through said recesses.

One of the ends of the strip may be sealed on the surface of said local joining, the other end of this strip comprising a free length which at least partially overlaps the sealed end.

According to a preferred embodiment, the inner layer of the multilayered flexible strip made of thermoplastic material comprises a central groove.

For simplifying the withdrawal of the flexible strip when the package is opened, the multilayered flexible strip preferentially comprises a narrow strip to be pulled off which is integral with the external surface.

When the cover has a hollow structure in its central portion and comprises around this portion a side wall whose exterior surface matches the interior surface of the side wall of the container such that the cover may be encased into the upper portion of the container, the depth of the hollow of the cover measured from the upper rim of the container is preferentially superior to the depth of the central line of the flexible strip sealed to said cylindrical surfaces, this depth being measured from the inner rim of the container.

For meeting the best requirements in the food hygiene, the package preferentially comprises a free annular portion, provided between said cylindrical surfaces, included between the faces of the cover and of the container when they are in contact with each other and said flexible strip sealed to said cylindrical surfaces.

This annular portion may be defined by an annular recess provided in the connection zone between the external surface of the side wall of the cover and the upper rim of the container.

The synthetic material of the cover and/or the container is a multilayered material comprising at least a barrier impervious for gas and vapour.

According to another embodiment in which the container comprises two fitting elements and the cover can be fitted with the upper element in order to delimitate two separated partitions, and in which the first element comprises a first cylindrical surface, the second element comprises a second cylindrical surface and the third element comprises a third cylindrical surface, said cylindrical surfaces being sealed simultaneously by the same flexible strip rounding all the package.

According to an alternative embodiment of the invention, the cover or the container comprises an opening for the filling of the container after the welding of the flexible sealed strip on said cylindrical surfaces of cover and container. The tight closing of the package after its filling is provided on an usual manner by welding a closing element of said opening on the cover respectively the container.

As in the first embodiment, the package is opened easily by pulling off the detachable flexible strip of the package, said closing element staying welded to the cover, respectively the container. This package advantageously permits to effect in advance the welding of the flexible strip on the cover and on the container during the manufacturing of said parts of the package, this manufacturing being cheaply made in a centralized unit away from the filling lines of the package.

The process of manufacturing of the package according to the invention in which this package is closed, after previous filling of the container whereby the cover is pressed onto the container by means of a stamp engaging the hollow portion of the cover and a support maintaining the container, is characterized in that the flexible strip is sealed around said cylindrical surfaces by applying a force against these surfaces by means of a tool kept to a sufficient temperature to assure the connection of the thermoplastic sealable material of the flexible strip with the thermoplastic sealable material of cylindrical surfaces.

According to an advantageous embodiment which permits to meet the best requirements in the field of food hygiene, the annular portion is cleaned by a jet of water and/or vapour after the container and the cover have been closed but before the flexible strip has been sealed onto the cylindrical surfaces.

In the case where the container is provided with an opening and a closing element sealable to the container after its filling, a zone of decreased resistance is provided, before the filling of the container, on at least one part of the upper circumference of this container, this zone of decreased resistance being closed by a flexible detachable tight strip welded on the side wall of the container and the closing element is welded to the container after its filling.

The zone of decreased resistance can be realized during the manufacturing and/or the shaping operation of the container by moulding, injection or blow-moulding of synthetic material.

This zone can also be realized in the container after the manufacturing or the shaping operation of the container by thermoforming. In this case a slit can be provided on at least a part of the circumference. This slit may be realized by sawing, milling, grinding, machining by means of fluid jet under pressure or by laser beam.

One of these applications of particular interest consists of packing food such as beverages, prefabricated or precooked dishes, sterilized or antiseptic substances or materials and others.

The present invention will be better understood by reference to several embodiments and the accompanying drawings wherein FIG. 1 comprises a perspective view of a first embodiment according to the invention.

FIG. 3 represents a partial plane view which illustrates in particular the supports receiving the ends of the flexible band.

FIG. 4 represents a sectional view along the line A—A of FIG. 3.

FIG. 5 represents a partial section view along the line B—B of FIG. 4.

FIG. 6 represents a partial perspective view illustrating the manner of fixation of the two ends of the flexible band.

Figure 1:
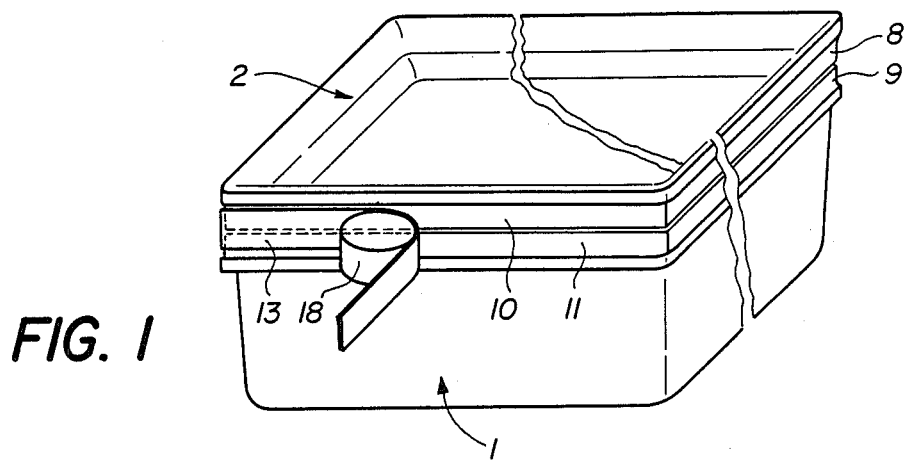
Figure 2:
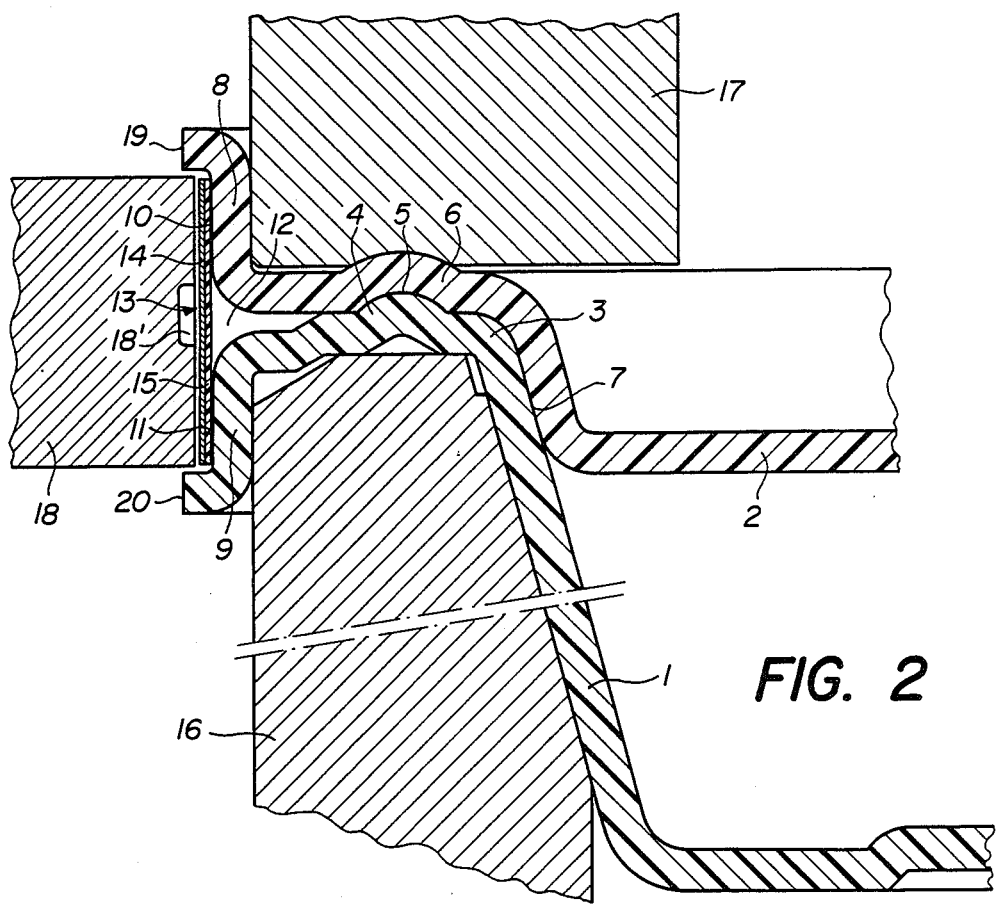
FIG. 2 represents a partial section view of the packing of FIG. 1 during its manufacture.

With reference to FIGS. 1 & 2 the illustrated packing is essentially composed by a container 1 and a cover 2 which is adjusted above the upper open end of the container. The container 1 comprises an upper edge 3 having an annular cushion 4. The shape, the dimensions and position of which correspond to those of an annular recess 5 being arranged in the lower surface of an outer edge 6 of the cover 2. This cushion and the recess engage one into the other thereby permitting a mechanical coupling of these two components. Moreover the cover 2 represents a hollow profile and comprises a straight or conical side wall which defines a zone of encasement, the shape of the outer surface thereof corresponding to that of the upper zone of the interior surface of the side wall 7 of the container 1. In this way the cover may be encased into the container. The cushion 4 and the recess 5 on the one hand and the conical side wall of the cover 2 and the inner surface of the side wall 7 of the container 1 on the other hand form the connection collar as mentioned above, by which the cover obtains its desired detachable character that means it may be put back on the container at any desired moment after its first withdrawal of the packing. The snake like cross section of of the connection collar assures a very efficient closing of the packing even if it is not yet sealed.

The perfect sealing is obtained by means of the sealing collar which is constituted by the two sealind boards 8 and 9 which are integral parts of the edge 6 and 3 of the cover 2 and the container 1 respectively. These sealing boards comprise each an outer cylindrical surface 10, 11 which are flush to each other. (By cylindrical surface should be understood all surfaces generated by the deplacement of a straight generating line in parallel relationship to itself along a closed guide curve.) These cylindrical surfaces are advantageously separated one from the other along at least a major portion of the periphery of the packing by a free annular space 12, the principle object therefor being the pressure cleaning of the packing which was previously filled for example by a beam of steam during which the two components (the container 1 and the cover 2) are maintained together by means which will be described below in more detail.

The two cylindrical surfaces 10 and 11 are connected to each other by a flexible band 13, which is preferentially fixed by heat sealing. This flexible band 13 of the multilayer type known per se comprises preferentially a diffusion barrier against gasses and vapors which is constituted by example of an aluminum foil 14 covered by a film 15 of a heat sealable material such as for example polypropylene compatible with the materials of which the packing is composed or at least with the inner layer of these components in the case that they are made of a multi-layer material. As mentioned above, the cover and the container comprise a diffusion barrier against gasses and vapors which resist particularly to the diffusion of oxygen and steam as well as all other substances which potentially lead to a degradation or a contamination of the product confined in the container.

In practice the closing of the packing is carried out in a manner which is described in the following with reference to FIG. 2. The container 1 is filled with the particular product whereupon the cover 2 is closed. In order to maintain the cover 2 in its position above the container 1 a support 16 retaining the container 1 and a stamp 17 applyings a predetermined pressure onto the edge of the cover 2 are used. The annular space 12 is subsequently cleaned preferentially by means of a beam of vapor to eliminate any particle or fibre of the product contained in the packing which may eventually cross the snake-like connecting collar in spite of all precaution. The cover still being pressed onto the container, the flexible band 13 is simultaneously sealed to the sealing boards 8 and 9 e. g. by means of a roll 18 being held at a convenient temperature and which is progressed around the packing by applying force against the flexible band 13 while the connecting boards 8 and 9 are supported by the side faces of the support 16 and the stamp 17. One may use all other possible pressure applying devices knownn per se suitable to permit the heat sealing of the flexible band 13 onto the sealing boards 8 and 9. The roll 18 comprises a central recess 18' which avoids the heat transfer to the central portion of the band 13 to avoid the closure of the central recess 29 by welding (see FIG. 6).

Obviously the boards 8 and 9 should be supported when the band 13 is welded against the cylindrical surfaces 10 and 11 to avoid that they bend or be deforemed following the application of the lateral pressure by the roll 18. In the presented embodiment a free annular space is arranged between the side wall of the container 1 and the sealing board 9 for the insertion of the support 16. The stamp 17 of appropriate profile may be inserted in a corresponding free annular space behind the sealing board 8. In this way may the lateral pressure being applied by the roll 18 onto the bands 13 be absorbed by the elements 16 and 17 which maintain the sealing boards 8 and 9 in their positions after closing the cover 2 above the container 1.

As shown in FIG. 2 the sealing boards 8 and 9 comprise each a projecting edge 19 and 20 respectively. The object of which is to assure an efficient protection of the flexible band 13 and to avoid its damaging by an exterior object during storage or manipulation of the packing. Said band preferentially comprising a diffusion barrier against gasses and steam assures a perfect seal of the packing around its entire periphery except in a connection zone of the two ends of the band, the sealing of which is described in the following.

To complete the sealing already obtained along a major portion of the periphery of the packing the cover and the container comprise each a support 21 respectively 22 (see FIGS. 3 and 4) which are comprised within the cylindrical surfaces of the corresponding sealing board of the cover and the container respectively along a small part of the periphery of the packing within which the free annular space 12 is filled out. At this point as shown in FIGS. 3 and 4 the contact surface between the supports 21 and 22 which is represented by the line 23 corresponds to a plane surface which is limited against the interior of the packing by the connecting collar and in particular by the outer zone of the cushion 4 being engaged in the corresponding recess 5. The two supports 21 and 22 are aligned with each other while the cover is maintained on the container and serves as abutment for the two ends of the band 13 when the latter is fixed to the cylindrical surfaces 10 and 11 of the sealing boards 8 and 9. In the case where the flexible band 13 comprises an outer layer constituting the diffusion barrier 14, for example of aluminum foil and an inner, heat sealable layer 15 for example of polypropylene, the inner layer of one end overlapping the outer layer of the other end may obviously not be welded onto the latter. In this case the sealing may not be completed other than by applying a square member 24 onto the supports 21 and 22 as illustrated in FIGS. 3, 4 and 5, thereby completely covering the line 23. The square member comprises advantageously a diffusion barrier 25 against gasses and vapors which is covered at its two surfaces with a layer 26 and 27 respectively of a heat sealable substance identical or compatible with the inner layer 15 of the flexible band 13 and with the material constituting the surfaces 10 and 11 of the sealing boards 8 and 9. The sealing of the two ends of the band may subsequently be completed.

It should be noted that the roll may be substituted by any other appropriate means which assures the sealing of the band onto the square member across its entire height.

To facilitate the opening of the sealed flexible band, one of the ends of the band should overlap the other one since its inner heat sealable surface does not adhere to the outer surface of the other end. This non-sealed elongation constitutes a tongue 28 which facilitates the detachment of the flexible band from the packing.

At the moment of the opening of the packing if the heat sealed layer of the band 13 adheres strongly to the sealing boards, which is most frequently the case, the detachment of the flexible band should cause the loosening and the cracking of the exterior layer of the multilayer material of the packing or at least the loosening of the gas diffusion barrier of the flexible band 13. This last possibility being the most advantageous one, may be favourised by the following measure. In order to avoid that the heat sealed film which rests on the cylindrical surface of the sealing board 8 and 9 keep the packing closed after the detachment of the aluminum foilo or a synethetic material such as for example PVDC constituting the diffusion barrier against gasses and vapors, no heat sealable material is provided along the medium axis 29 of the flexible band 13 as illustrated in FIG. 6. In this way after loosening of the diffusion barrier, the two parts of the heat sealed film separate from each other and rest on the sealing boards. The lack of heat sealing material along the center line of the band 13 is automatically compensated at the band end which are sealed onto the square member by the applied pressure eaqually distributing the softened heat sealing material across the square member.

The beginning of the detachment may be facilitated in the following manner. Two symmetrical lateral notches 31 and 31' are arranged at the underlying band end 30. When the other end 32 is welded onto the underlying one only the external portions corresponding to the notches 31 and 31' adhere to the heat sealable layer of the square piece 24 comprising two heat sealing surfaces both of which being welded to the supports 21 and 22. The central portion of the heat sealable layer of the band end 32 does not adhere to the barrier which forms the exterior layer of the underlying band end 30. In this way when the flexible band may not be detached from the external surface of the square piece at the withdrawal of the band end 32, the diffusion barrier situated on the external surface of the band end 32 will be pulled off thereby reliably opening the packing.

Only the square member 24 rests on the supports 21 and 22. It may be cut which is not a big problem in view of its weak dimensions or it may be used as a hinge which facilitates the repositioning of the cover.

For this effect it may be envisaged to increase the length of the supports to obtain a packing with a swing cover or to provide two pairs of supports which are separated from each other to provide two hinges which are arranged at the same side of the packing having square or rectangular shape.

Figure 7:
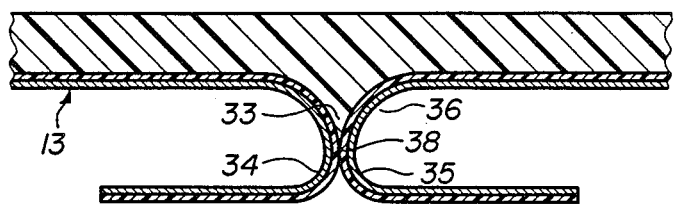
FIG. 7 represents a partial section view of another manner of fastening the ends of the flexible bands.
Figure 8:
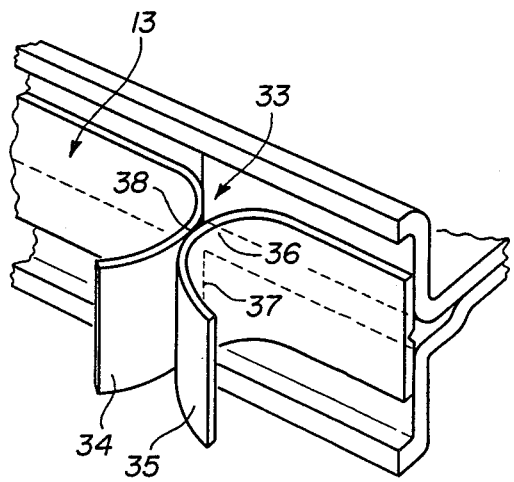
FIG. 8 represents a perspective view corresponding to the view of FIG. 7.

The FIGS. 7 and 8 illustrate a modification which permits to eliminate the superposition of the two band ends in the case where the cover 2 and the container 1 are produced by moulding techniques. The two supports 21 and 22 are profiled as to form beak-like projections 33 the edge of which being essentially perpendicular to the slope of the flexible band. These projections lead the two band ends 34 and 35 away from the cylindrical surfaces 10 and 11, and bring the ends 34 and 35 of the band 13 into back-to-back contact with each other after the band 13 has once completely surrounded the packing, whereby the heat sealable layers of the band ends facing each other may subsequently be sealed together along a zone 38 which extends across the entire width of the band 13 beginning with a line containing the edges 36 and 37 of said projections 33. The welding may be carried out at the level of the projections by means of two rolls or two other suitable tools which apply simultaneously a transverse force against the two band ends.

Figure 9:
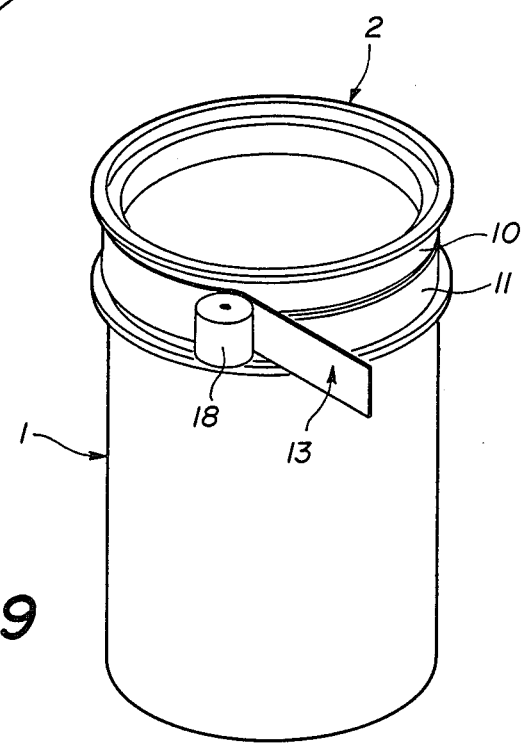
FIG. 9 is a perspective view representing another embodiment of the invention.
Figure 10:
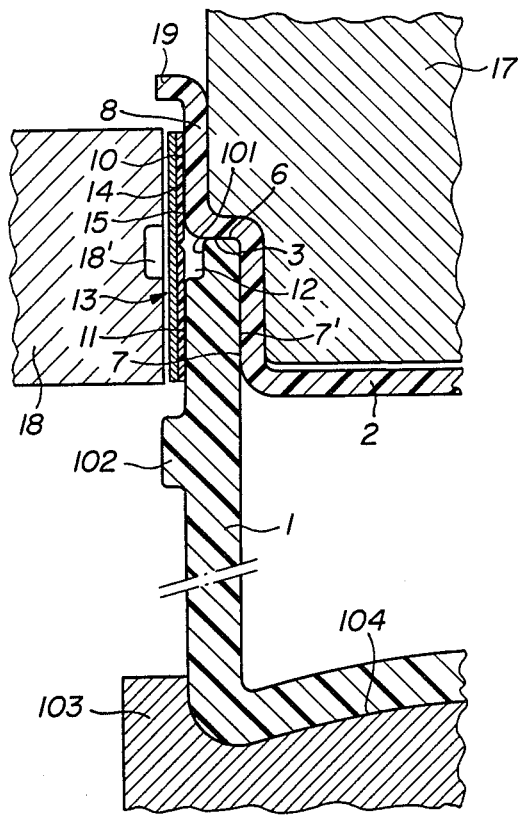
FIG. 10 represents a partial section view of the packing according to FIG. 9.

FIGS. 9 and 10 represent another embodiment of the packing according to the invention. Although the represented packing is illustrated having a surface of rotation, the scope of the invention is not limited to this particular form and may be applied to whatever appropriate shape according to the use as described in conection with the preceding packing. This packing now comprises a container 1 and a hollow cover 2 adjusted above the upper end of the container 1. The container is preferentially manufactured by an injection moulding process whereby its side walls may have any shape and variable thickness. The cover 2 may advantageously but not necessarily be made by a thermal moulding procedure. The container 1 comprises an upper edge 3 of essentially plane shape and its dimensions are complementary to those of the external edge 6 of the cover 2. This cover has a hollow profile and comprises a straight or slightly conical side wall 7' which defines a zone of encasement. The shape of the exterior surface of this side wall 7' corresponds to that of an upper zone of the interior surface of the side wall 7 of the container 1. Once the cover is encased within the container, the upper edge 3 of the container 1 and the exterior edge 6 of the cover 2 on one hand and the conical or straight side wall of the cover 2 and the interior surface of the side wall 7 of the container on the other hand form the above mentiones connecting collar.

The cover 2 comprises a sealing board 8, a portion of the exterior surface of which defines one of said cylindrical surfaces 10. The other cylindrical surface 11 belonging to the container is in this case constituted by a section of the peripheral surface of the side wall of the container 1 adjacent to its upper edge 3. The two cylindrical surfaces 10 and 11 form said sealing collar. As above, a flexible band 13 is sealed simultaneously onto the two cylindrical surfaces 10 and 11 to complete said sealing collar. The band comprises again an inner surface 14 which is a diffusion barrier against gasses and vapors realised e.g. by an aluminum foil and an interior surface 15 of a heat sealable material.

The two cylindrical surfaces 10 and 11 are separated from each other by a free space 12, which is constituted in this case by an annular recess 101 arranged in the connection zone between the exterior surface of the side wall of the upper edge 3 of the container 1. To protect the flexible band the board of the cover 2 comprises advantageously a projecting edge 19. The side wall of the container 1 comprises advantageously a peripherical cushion 102 the thickness of which corresponds essentially to the depth of the edge 19 of the board 8 of the cover 2.

At the closing of the packing the previously filled container 1 is supported at its bottom by a support 103 the profile of which is preferentially at least partially adapted to that of the bottom 104 of the container 1. This support 103 corresponds to the support 16 used in the embodiment according to FIGS. 1 and 2. A stamp 17 permits to press the cover 2 onto the container 1 and additionally reinforces the connection boards of the cover and the container during the application of the flexible band 13 by means of a roll or any other appropriate tool 18.

Figure 11:
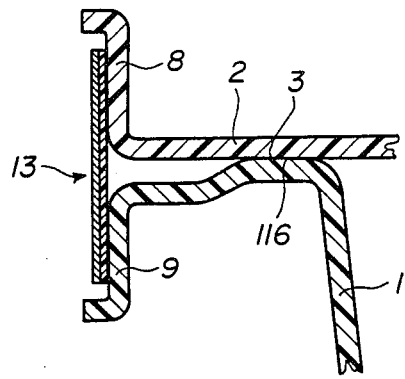
FIG. 11 illustrates a partial section view of a modification of the embodiment according to FIGS. 1 and 2.

The embodiment illustrated in FIG. 11 differs from that which was described under FIGS. 1 and 2 in that the connecting collar is not formed by encasement of the cover and the container. In this embodiment the two plane annular coupling faces are constituted by the upper edge 3 of the container 1 and the exterior surface 116 of the bottom of the cover 2. The sealing boards 8 and 9 are integral parts of the cover 2 and the container 1 respectively and are sealed by the band 13.

Figure 12:
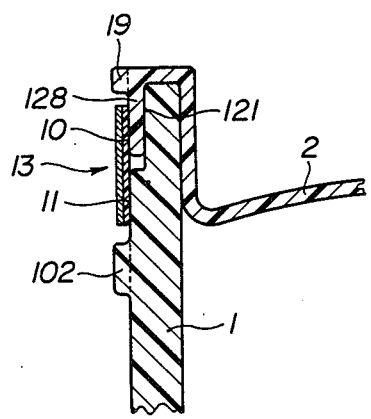
FIG. 12 represents a section view of a modification of the embodiment according to FIGS. 9 and 10 and FIG. 13 represents another embodiment of the invention which has the particularity of comprising two compartments being separated one from the other.

The embodiment according to the FIG. 12 is a modification of the one illustrated in FIGS. 9 and 10. The injection molded cover 2 comprises in this case a board 128 which is bent to the bottom of the container 1. The side wall of the container 1 is profiled such that the board 128 of the cover may be encased within the substance of the side wall. To this effect this side wall conprises an annular groove 121 which corresponds to the annular recess 101 of FIG. 10, but the height of which is sufficient to receive the board 128 and to arrange for the free annular space 12 between the two cylindrical surfaces 10 and 11 which are sealed by the band 13. A peripheral cushion 102 as well as a board 19 may be provided to protect the flexible band 13 against shocks and eventual damage which may be ocurring during the manipulations of the packing.

The different packings described above may have several and different applications. They may be used where it is necessary to store a product in a sealed packing to avoid contamination of this product. This is the case in particular with food specially with pre-arranged or pre-cooked dishes. The packing which is illustrated in FIGS. 9 and 10 is particularly applicable for beverages. Other utilisations such as the package of sterilized or antiseptic materials or products may be envisaged.

Figure 13:
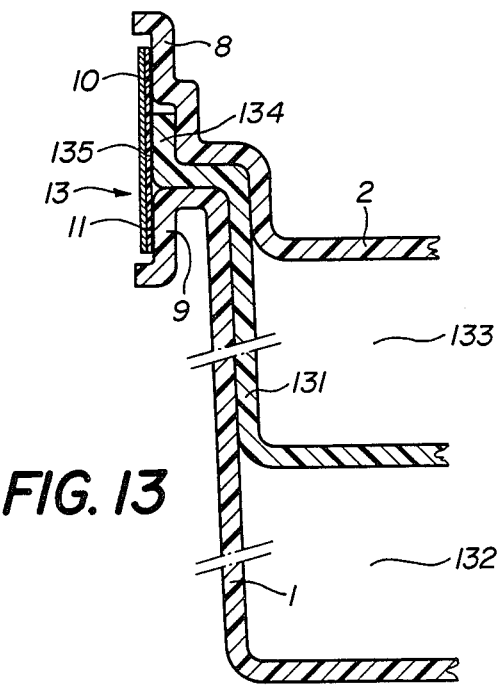

The packing according to FIG. 13 is particularly designed for storage of two component products which should be mixed only shortly before their use. This is the case specially with certain glues, paints, mastics and so forth of two components. It is known that these components must be stored in containers with two sealed compartments to avoid penetration of vapours coming from one compartment into the other one.

For this purpose the packing as illustrated in FIG. 13 comprises a principle container 1, a cover 2 and a partition wall 131 which limits a first compartment 132 with the bottom of the container 1 and a second compartment 133 with the cover 2. This cover is provided with a sealing board 8 carrying out of said cylindrical surfaces. The container 1 is equally provided with a sealing board 9, carrying the other cylindrical surface. The partition wall 131 is provided with a third sealing board 134, which carries a third cylindrical surface 135. The three cylindrical surfaces 10, 11 and 135 are all flush to each other such that the flexible band 13 may simultaneously be sealed onto the three surfaces in order to form said sealing collar for the three principle components of this packing. The connecting collar is obtained in this case by the encasement of the intermediary partition wall with the container 1 and the encasement of the cover 2 in the hollow part of the partition wall 131.

The above embodiments illustrated by FIGS. 1 to 13 require, on the filling line of the container, the fitting of an equipment especially definited for the fitting and the winding of the flexible strip around the container as its welding after the filling of the container.

FIGS. 14 to 26 illustrate some embodiments of alternatives of the invention in which the flexible tight strip is sealed to the cover before the filling and the definitive closing of the package, permitting to simplify considerably the lines of filling. The flexible tight strip can be advantageously sealed to the cover and to the container in advance, during the manufacturing of these elements which can be centralized, the packages and the products for the filling can be used on several filling lines after a possible stockage. In this alternative, either the cover or the container is provided with an opening closed by an usual welding, well known and for which equipments are existing, of a closing element after the filling of the package.

Figure 14:
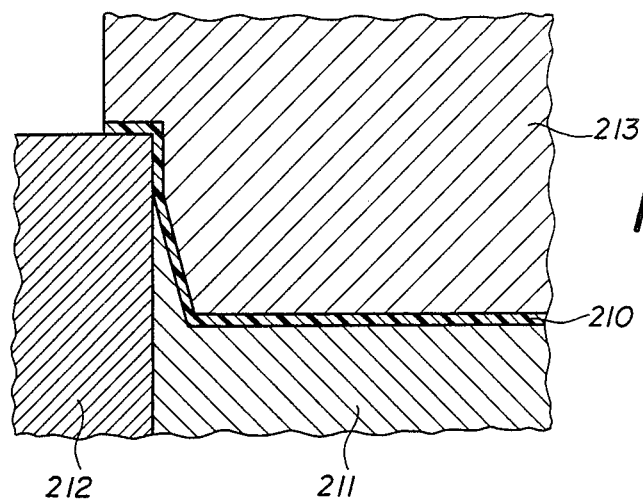
FIG. 14 represents a partial section illustrating a first manufacturing phase by thermoforming a package according to the invention.

With reference to FIG. 14, the container 210 of the package is manufactured for example by thermoforming a sheet of a multilayered synthetic material arranged between a shaping die comprising a central element 211 and an outer annular element 212. A plug die 213 cooperates with the shaping die to shape the container 210.

Figure 15:
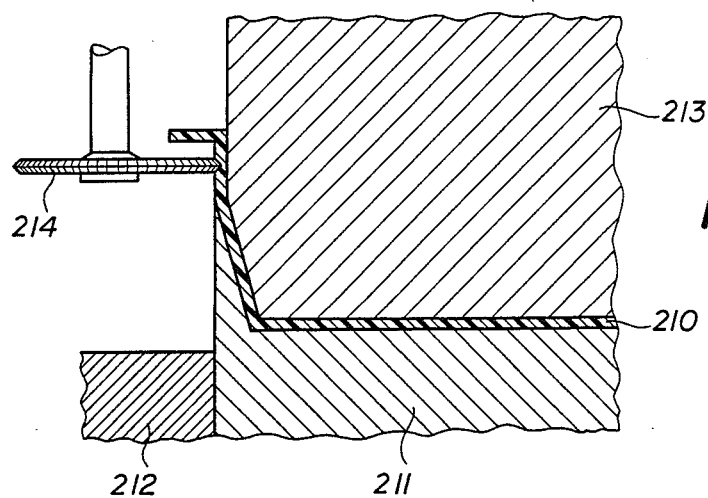
FIG. 15 represents a second manufacturing phase during which a zone of decreased resistance is formed in the container of the package.
Figure 16:
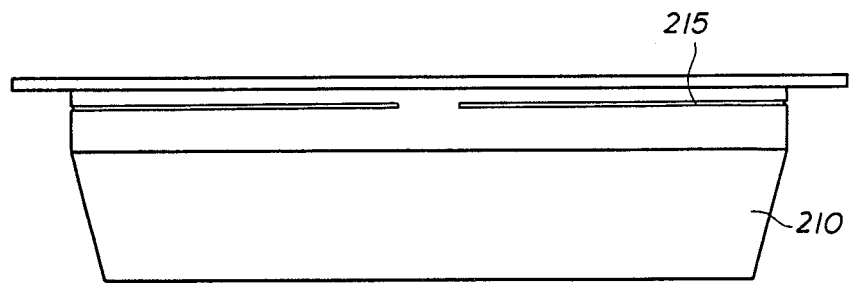
FIG. 16 represents a front view of the container of the package according to the invention after forming the zone of decreased resistance.

After this forming phase, the central element 211 of the shaping die and the plug die 213 are raised to allow access of a saw blade, a milling cutter, a circular knife or a grinding wheel 212 as is shown in FIG. 15. This saw blade 214 is designed to cut a notch in the form of a slit 215 (see FIG. 16) on at least a part of the periphery of the container 210. This slit, which is preferably formed over a major part of the periphery, in the vicinity of the upper part of the container, forms a zone of decreased resistance allowing the packing to be easily opened later on.

The technique of sawing or milling to form the slit is used only in certain cases. When the packing is made by injection, the slit may be provided during its manufacture. In certain cases this partial slit may be replaced by cutting through to separate the container into two juxtaposed parts. For other embodiments, the slit may likewise be replaced by a deep notch which leaves a slight thickness of material remaining in the vicinity of the inner side of the container.

Figure 17:
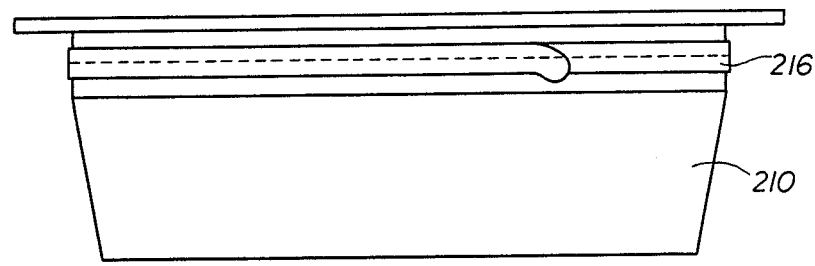
FIG. 17 represents a front view of the package after fitting the flexible strip.
Figure 18:
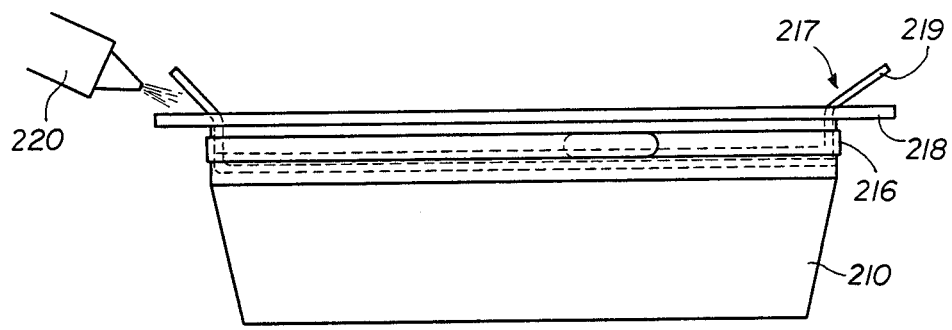
FIG. 18 represents a front view of the package after applying the closing element and during the phase of cleaning with vapour.

The following stage, illustrated by FIG. 17 consists in covering the slit 215 with a removable, flexible, impervious strip 216. This strip comprises a barrier to diffusion of gas and vapour and is heat welded on the outer side of the container. This operation is effected before filling the container, which means at a time when this container can be quite freely handled, without the slightest risk to the contents.

After more or less prolonged storage, the container 210 is then filled and a covering cap 217 is applied to the container. In the example illustrated in FIG. 18 the container comprises a connecting edge portion 218 and the hollow covering cap likewise comprises a connecting edge portion 219. As is shown in this figure, the edge portion 219 is slightly bent upwards so as to form with the edge 218 of the container an open beak which allows cleaning of the connecting edge portions 218 and 219 with steam, or disinfection with any other suitable substance, by means of one or more nozzles 220.

Figure 19:
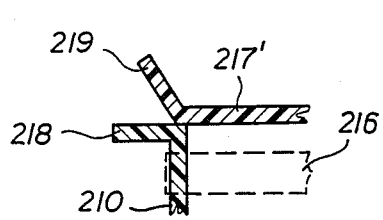
FIG. 19 represents a partial section of another embodiment of the closing element.

FIG. 19 illustrates a container 210 provided as before with a connecting edge portion 218 and a covering cap 217' comprising a connecting edge portion 219. The cap 217' differs from the cap 217 in that it is plane and not hollow as in the previous case.

Figure 20:
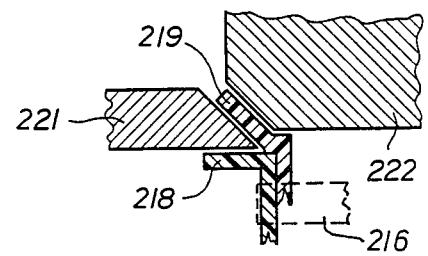
FIG. 20 represents a partial section illustrating the phase of heating the connecting edges of the closing element and the container.
Figure 21:
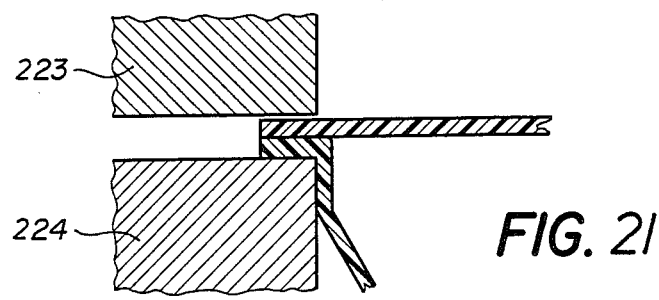
FIG. 21 illustrates the phase of welding these connecting edges.

The two phases of welding the connecting edge portions 218 and 219 are illustrated by FIGS. 20 and 21. A radiant body 221 with an appropriate profile, formed of at least two laterally mobile slides, is arranged for introduction into the beak formed by the two edge portions 218 and 219 on the entire periphery of the container. A plug die 222 retains the edge portion 219 in its inclined position. This radiant body serves to soften at least the superficial layer of the edge portions so as to permit their welding, when the edge portion 219 of the covering cap is turned down against the edge portion 218 of the container, by means of a plug die 222 and a retaining die 224.

Figure 22:
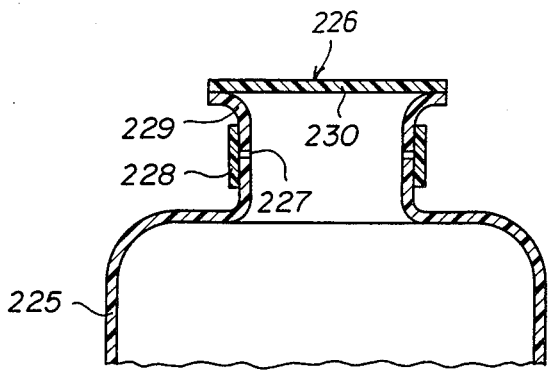
FIG. 22 represents a partial section of another embodiment of a package according to the invention.

FIG. 22 illustrates another embodiment of a package, which may be a bottle 225 intended to contain a liquid such as beer, fruit juice, mineral water, or any liquid preparation. The capsule 226 of this bottle is initially either entirely separated from the body of the bottle, or partly attached. The connecting slit 227 is sealed by a flexible, impervious strip 228 welded on the whole periphery of the neck of the bottle. In the connecting zone of the two ends of the flexible strip, sealing may be ensured, in the case where the cap 226 is entirely separated from the body of the bottle, by a weld or an applied covering on which said ends of the strips are superimposed. The capsule 226 is initially composed of an annular section 229 and a plane cap 230. The annular section 229 is mounted on the neck of the bottle and fixed by means of the flexible strip 228 before filling the bottle. The cap is welded onto the annular section 229 after filling the bottle. Opening the body is achieved by tearing off the flexible strip.

This package presents the advantage of being very simple to use. The flexible strip which comprises a barrier to gas and vapour dissusion, generally in form of an aluminum film, presents a tear tab at the location where the two ends of the strip overlap. In order that the overlap zone may be sealed, it is preferably positioned at the location where the slit forming the zone of decreased resistance is interrupted. After tearing off the strip, which operation amounts to peeling off this strip, the inner layer remaining welded to the container wall, the utilizer can open the package. In the case where the covering cap is hollow, closing the package remains possible provided that the hollow of the covering cap presents a sufficient depth for the new covering cap, formed of the old cap to which is welded a belt initially constituting the part of the container situated above the zone of decreased resistance, to be able to fit onto the container.

Figure 24:
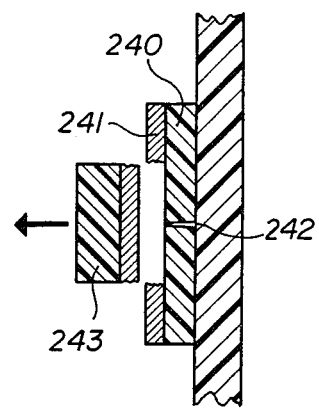
FIG. 24 represents a sectional view of this strip after it is torn off.
Figure 23:
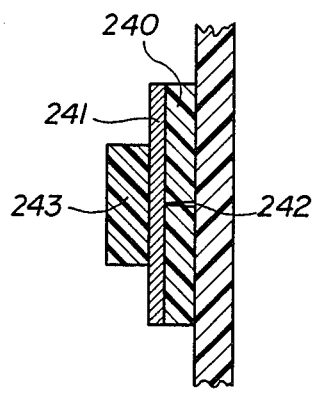
FIG. 23 represents a sectional view of a flexible removable strip according to a preferred embodiment.

FIG. 23 illustrates by way of an example an advantageous embodiment of the removable flexible strip used within the framework of the present invention. This strip comprises an inner layer 240 of a thermally sealable material for example of polypropylene compatible with the outer thermally sealable side of the container and a barrier 241 impervious to gas and vapour, formed for example of a thin film of aluminium, of which the thickness is for example 10 microns. The inner layer 240 advantageously comprises a median notch 242 facilitating separation of the two parts of the package after tearing off the strip. To facilitate tearing off the strip, the latter is provided with a tear thread or narrow strip 243 with a high mechanical resistance, formed for example of an epoxy-fiberglass composite, attached to the aluminum file forming the barrier impervious to gas and vapour or of another outer layer of the multilayered strip. The narrow strip 243 preferably adheres very strongly to this layer or to the barrier film, so that when tearing it off, the barrier is completely removed or is torn in its middle, as is shown by FIG. 24. To facilitate such tearing off one may provide lateral notches formed for example by means of cutter wheels.

Figure 25:
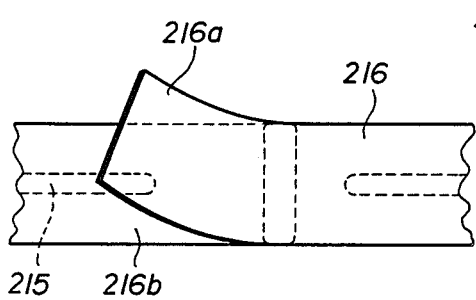
FIG. 25 illustrates in greater detail the sealing zone of the end sections of the strip.

FIG. 25 illustrates in greater detail the end sections of the strip 216 The two end sections 216a and 216b are sealed over the zone of the container in which the slit 215 is interrupted. The section 216a forms a tear tab which may moreover be superimposed (as shown by the figure) and sealed on a part of the end section 216b.

Figure 26:
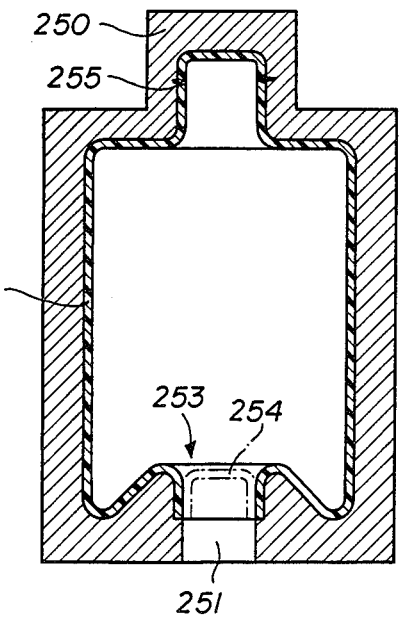
FIG. 26 represents schematically an advantageous embodiment of a type of package according to the invention.

FIG. 26 illustrates an advantageous mode of making a bottle by a blowing process. A blow mould 250 comprises at its base an opening 251 which permits introduction of the blowing needle. The container or bottle thus obtained, comprise an opening 253 disposed at the bottom. This opening, used for fillimg (after turning the bottle around) is then closed off for good by a heat welded bottom 254.

The zone of decreased resistance is preferably formed at the time of blowing, thanks to the presence of knives 255 disposed within the mould 250.

The present invention is not limited to the described embodiments, but may undergo different modifications and may present different variants obvious to a person skilled in the art.

I claim:

1. Sealed package comprising a container having an opening and a cover which are made of a synthetic moulded, blown or thermoformed material, said container and said cover being made of juxtaposed divided elements, the external faces of said container and said cover being made of a thermoplastic material and having cylindrical surfaces flush with each other, and a flexible detachable strip sealed on said cylindrical surfaces to hold the cover on the container, said flexible strip being multilayered with an internal surface made of a thermoplastic material sealable to said synthetic material, at least one intermediate layer made of a material impervious to gas and vapor, and an external layer made of a material which is not sealable to said thermoplastic material, said flexible strip being sealed to said container and to said cover along two parallel closed loop-shaped sealing zones extending without interruption on said cylindrical surfaces, said cylindrical surfaces each being provided on a part of their circumference with an outwardly extending beak-like projection, the edges of which are flush with each other perpendicularly to the axis of said flexible strip, the two ends of said flexible strip being sealed back to back to the end of said edges.

2. Package according to claim 1, wherein said container comprises two fitting elements and said cover can be fitted with the upper element in order to delimit two separated partitions, the first element comprising a first cylindrical surface, the second element comprising a second cylindrical surface and a third element comprising a third cylindrical surface, and wherein these three cylindrical surfaces are simultaneously sealed by the same flexible strip around the entire package.

3. Sealed package comprising a container having an opening and a cover which are made of a synthetic moulded, blown or thermoformed material, the external faces of said container and said cover being made of a thermoplastic material and having cylindrical surfaces flush with each other, and a flexible detachable strip sealed on said cylindrical surfaces to hold the cover on the container, said flexible strip being multilayered with an internal surface made of a thermoplastic material sealable to said synthetic material, at lease one intermediate layer made of a material impervious to gas and vapor, and an external layer made of a material which is not sealable to said thermoplastic material, said flexible strip being sealed to said container and to said cover along two parallel closed loop-shaped sealing zones extending without interruption on said cylindrical surfaces, said cover being integral with said container through at least one local joining of their faces, said local joining being adapted to connect said cylindrical surfaces along a part of their circumference, and wherein said local joining is provided with a square element having two faces coated with a material sealable to said thermoplastic material coating the external faces of said container and said cover, said square element being sealed on said cylindrical surfaces of said container and said cover.

4. Package according to claim 3, wherein said container comprises two fitting elements and said cover can be fitted with the upper element in order to delimit two separated partitions, the first element comprising a first cylindrical surface, the second element comprising a second cylindrical surface and a third element comprising a third cylindircal surface, and wherein these three cylindrical surfaces are simultaneously sealed by the same flexible strip around the entire package.

5. Package according to claim 3, including supports respectively flush with said cylindrical surfaces of said container and said cover, said square element being sealed on said juxtaposed supports and forming an uninterrupted zone joining said cover to said container.

* * * * *